(12) United States Patent
Goodhand et al.

(10) Patent No.: US 10,787,270 B2
(45) Date of Patent: Sep. 29, 2020

(54) PROPULSOR

(71) Applicant: ROLLS-ROYCE plc, London (GB)

(72) Inventors: Martin N. Goodhand, Derby (GB); Matthew Moxon, Derby (GB)

(73) Assignee: ROLLS-ROYCE PLC, London (GB)

( * ) Notice: Subject to any disclaimer, the term of this patent is extended or adjusted under 35 U.S.C. 154(b) by 65 days.

(21) Appl. No.: 15/899,481

(22) Filed: Feb. 20, 2018

(65) Prior Publication Data

US 2018/0237126 A1 Aug. 23, 2018

(30) Foreign Application Priority Data

Feb. 22, 2017 (GB) .................................. 1702822.6

(51) Int. Cl.
*B64D 27/02* (2006.01)
*B64C 11/18* (2006.01)
(Continued)

(52) U.S. Cl.
CPC .............. *B64D 27/02* (2013.01); *B64C 11/18* (2013.01); *B64C 11/48* (2013.01); *B64C 21/00* (2013.01);
(Continued)

(58) Field of Classification Search
CPC ..... B64C 21/02; B64C 2230/04; B64C 11/48; B64C 21/00; B64C 11/18; B64C 2230/00;
(Continued)

(56) References Cited

U.S. PATENT DOCUMENTS 2,982,361 A * 5/1961 Rosen ..................... B64C 11/48
416/44
4,630,787 A * 12/1986 Middlebrook .......... B64C 11/18
244/35 R (Continued)

FOREIGN PATENT DOCUMENTS

EP 3048042 7/2016
GB 873851 7/1961
(Continued)

OTHER PUBLICATIONS

European Search Report dated Mar. 29, 2018, issued in EP Patent Application No. 18157589.
(Continued)

*Primary Examiner* — Kenneth Bomberg
*Assistant Examiner* — Hakeem M Abdellaoui
(74) *Attorney, Agent, or Firm* — Brinks Gilson & Lione

(57) ABSTRACT

A boundary layer propulsor comprises a rotor and a plurality of first aerofoil blades. The rotor has an axis of rotation. The plurality of first aerofoil blades extends radially from the rotor and is arranged in a circumferential array around the axis of rotation. Each of the first aerofoil blades has, in a radially outward sequence, a radially proximal portion, a middle portion, and a radially distal portion. The radially proximal portion has a first cambered cross-section, the middle portion has a second uncambered cross-section, and the radially distal portion has a third cambered cross-section. The first cambered cross-section is cambered in an opposite sense to the third cambered cross-section.

10 Claims, 5 Drawing Sheets

(51) Int. Cl.
*B64C 11/48* (2006.01)
*B64C 21/00* (2006.01)

(52) U.S. Cl.
CPC ...... *B64C 2230/00* (2013.01); *B64C 2230/04* (2013.01); *Y02T 50/166* (2013.01)

(58) Field of Classification Search
CPC ... B64C 2230/28; B64D 27/02; Y02T 50/166; H02K 16/005
See application file for complete search history.

(56) References Cited

U.S. PATENT DOCUMENTS

| | | | |
|---|---|---|---|
| 4,911,612 A | 3/1990 | Rodde et al. | |
| 4,927,331 A * | 5/1990 | Vuillet | B64C 11/18 416/238 |
| 5,791,878 A | 8/1998 | Wainauski et al. | |
| 6,152,405 A * | 11/2000 | Muller | B64C 3/48 244/212 |
| 2008/0226450 A1* | 9/2008 | Clarke | F03B 3/126 416/124 |
| 2012/0273609 A1* | 11/2012 | Prat | B64C 21/025 244/54 |
| 2013/0181562 A1* | 7/2013 | Gieras | H02K 16/02 310/114 |
| 2015/0295481 A1* | 10/2015 | Harris | H02K 16/005 290/43 |
| 2017/0121031 A1* | 5/2017 | Stieger | B64C 21/06 |
| 2018/0118364 A1* | 5/2018 | Golshany | B64D 35/08 |
| 2018/0138766 A1* | 5/2018 | Moore | H02K 1/187 |
| 2018/0148162 A1* | 5/2018 | Trahmer | B64C 1/0009 |
| 2018/0156109 A1* | 6/2018 | Suciu | F02C 6/08 |
| 2018/0269760 A1* | 9/2018 | Palmer | B64C 21/06 |

FOREIGN PATENT DOCUMENTS

| | | | | |
|---|---|---|---|---|
| GB | 2542184 A | * | 3/2017 | ............ B64D 27/14 |
| WO | 9914112 | | 3/1999 | |

OTHER PUBLICATIONS

Great Britain Search Report dated Aug. 16, 2018 issued in GB Patent Application No. 1702822.6.

* cited by examiner

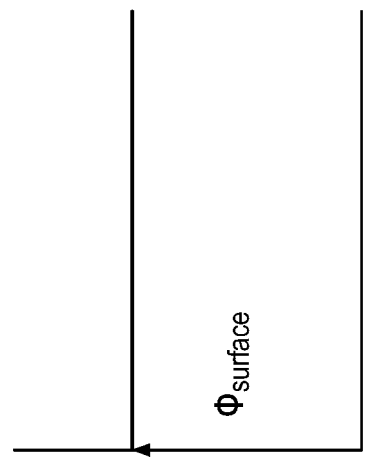
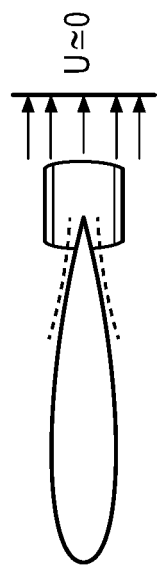
FIG. 1A
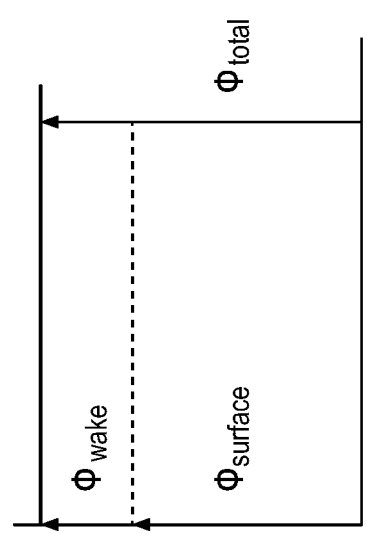
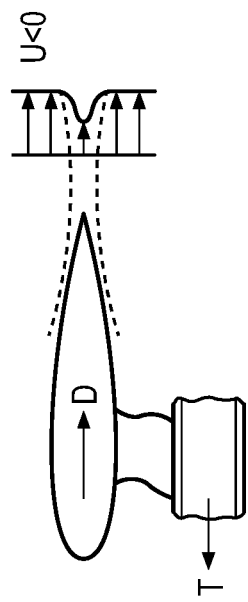
FIG. 1B

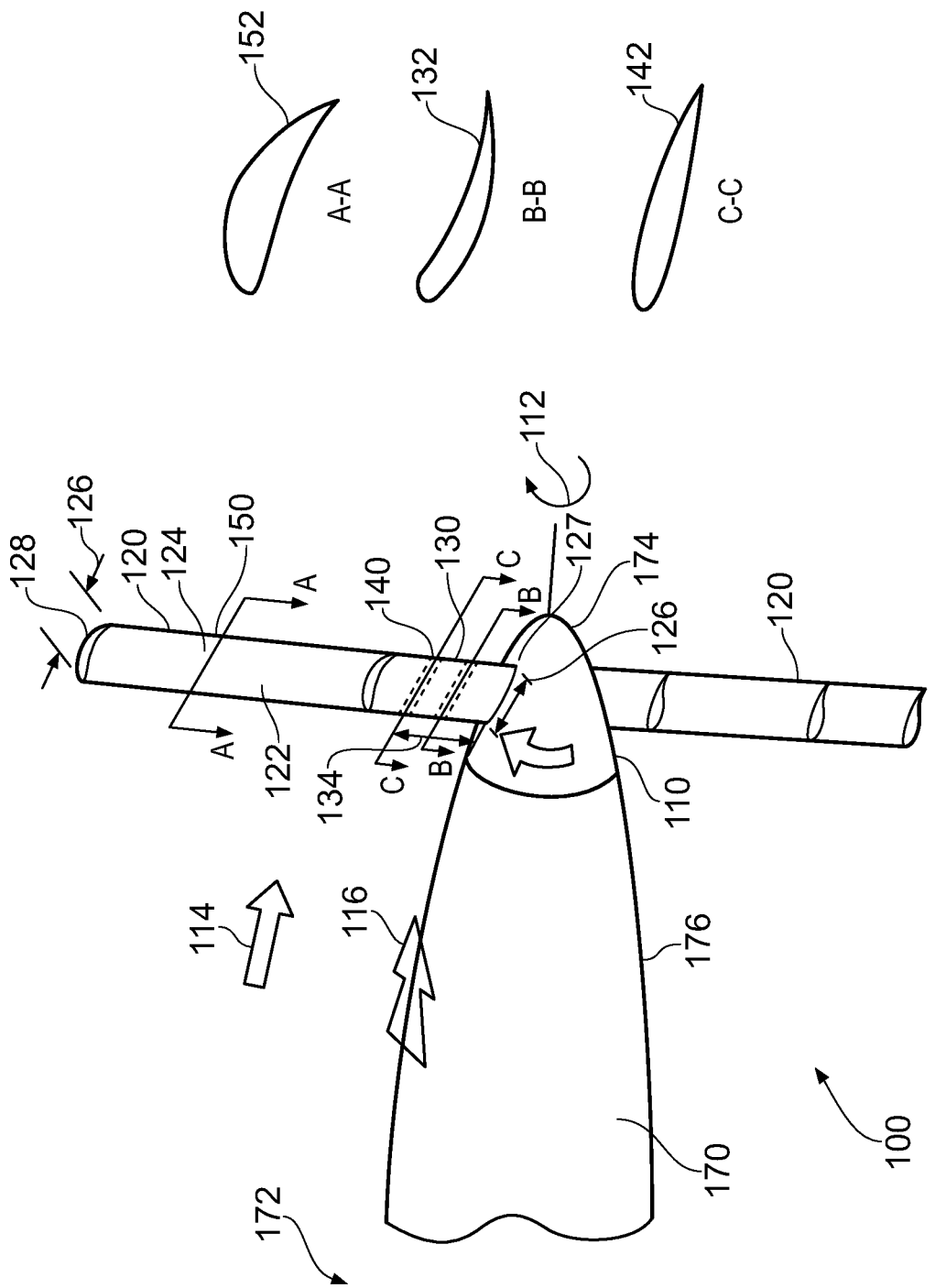

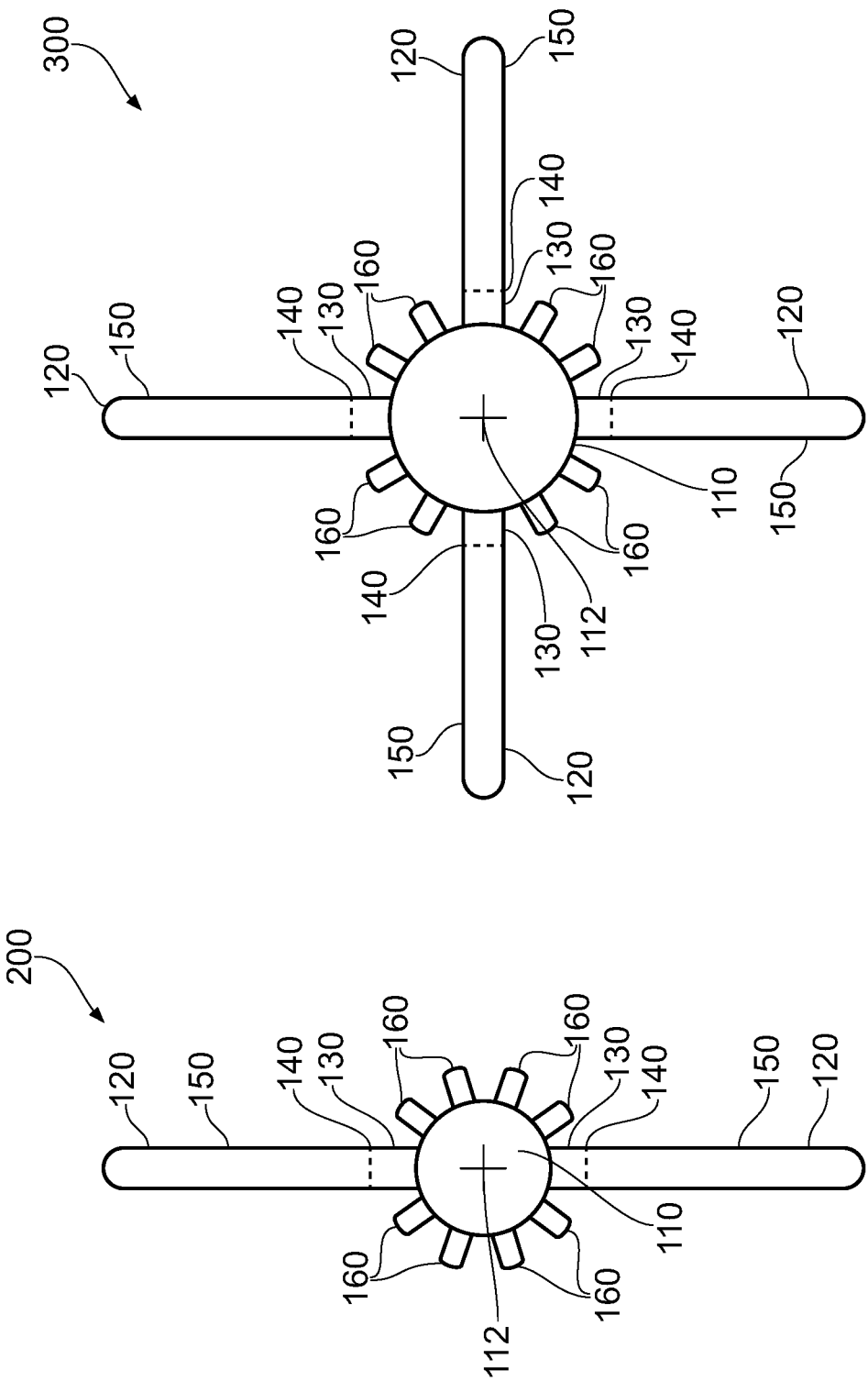

PROPULSOR

CROSS-REFERENCE TO RELATED APPLICATION

This application is based upon and claims the benefit of priority from British Patent Application Number 1702822.6 filed Feb. 22, 2017, the entire contents of which are incorporated by reference.

FIELD

The present disclosure relates to a passive boundary layer propulsor and particularly, but not exclusively, to a passive boundary layer propulsor for an aircraft.

BACKGROUND

It is well known that an aircraft body in flight creates a body wake, which is the disturbance in downstream flow resulting from the air flowing over the aircraft body. A proportion of the body wake results from the boundary layer flow over the surface of the aircraft detaching from the surface as the flow leaves the aircraft (i.e. mixing losses).

Reducing the size of, or eliminating the body wake altogether reduces the losses generated in the wake and also in the main jet by reducing the thrust requirements from the main engines. A schematic example is shown in FIG. 1A in which $\phi_{surface}$ represents the dissipation that occurs due to skin friction, and $\phi_{wake}$ represents the dissipation that occurs due to wake mixing.

The concept of Fuselage Boundary Layer Ingestion places the aircraft's engine at or immediately behind the tail of the aircraft so as to ingest the boundary layer flow as it leaves the aircraft's fuselage surface. In this way, the downstream mixing losses in the fuselage wake can be eliminated or significantly reduced as illustrated in FIG. 1B. However, this approach requires the heavy and bulky engines to be mounted at the rear of the aircraft, which makes the construction and operation of the aircraft less cost effective for a user.

SUMMARY

According to a first aspect of the present disclosure there is provided a boundary layer propulsor including a rotor having an axis of rotation, and a plurality of first aerofoil blades extending radially from the rotor and arranged in a circumferential array around the axis of rotation. Each first aerofoil blade has, in a radially outward sequence, a radially proximal portion, a middle portion, and a radially distal portion. The radially proximal portion having a first cambered cross-section, the middle portion having a second uncambered cross-section, and the radially distal portion having a third cambered cross-section. The first cambered cross-section being cambered in an opposite sense to the third cambered cross-section.

The boundary layer propulsor of the present disclosure is a passive boundary layer propulsor. In other words the propulsor is not actively powered by an engine or other equivalent source of motive power.

The radially proximal portions extend radially from the rotor to a distance approximately equal to a thickness of the boundary layer that is generated when the aircraft is in its normal operating conditions.

The boundary layer propulsor is powered by an air flow passing over the radially distal portions of the aerofoil blades. The radially distal portions of the aerofoil blades are configured as a turbine. The radially distal portions of the aerofoil blades extract energy from the air flow passing over the aerofoil blades.

The radially proximal portions of the aerofoil blades are configured as a compressor. The radially proximal portions of the aerofoil blades accelerate the low momentum flow at the base of the boundary layer to thereby minimise the mixing losses resulting from the boundary layer detaching from the surface of the aircraft.

The plurality of first aerofoil blades may be arranged to fold such that the axis of each first aerofoil blade is aligned to be approximately parallel with the axis of rotation.

Optionally, the first cambered cross-section is a negative camber, and the third cambered cross-section is a positive camber.

The radially distal portions of the aerofoil blades are provided with a positively cambered cross-section. In this way, the radially distal portions of the aerofoil blades are configured as a turbine array.

The radially proximal portions of the aerofoil blades are provided with a negatively cambered cross-section. In this way, the radially proximal portions of the aerofoil blades are configured as a compressor array.

Optionally, each first aerofoil blade has a first surface and an opposite second surface, each of the first surface and second surface being provided with a smoothed transition between the radially proximal portion and the middle portion, and between the middle portion and the radially distal portion.

The smoother transition between the portions of each aerofoil blade minimise aerodynamic losses that might result from vortices generated at sharp transitions or edges.

Optionally, the plurality of first aerofoil blades comprises between two and six first aerofoil blades.

Optionally, the plurality of first aerofoil blades is equi-spaced around the axis of rotation. Equi-spacing the first aerofoil blades simplifies the manufacture of the propulsor.

In an alternative arrangement, the first aerofoil blades are unevenly spaced around the axis of rotation. This uneven spacing will reduce vibration and/or noise generation problems.

According to a second aspect of the present disclosure there is provided a boundary layer propulsor that includes a rotor having an axis of rotation, a plurality of first aerofoil blades extending radially from the rotor and arranged in a circumferential array around the axis of rotation, and a plurality of second aerofoil blades extending radially from the rotor and arranged in a circumferential array around the axis of rotation. Each first aerofoil blade has, in a radially outward sequence, a radially proximal portion, a middle portion, and a radially distal portion. The radially proximal portion having a first cambered cross-section, the middle portion having a second uncambered cross-section, and the radially distal portion having a third cambered cross-section, the first cambered cross-section being cambered in an opposite sense to the third cambered cross-section. Each second aerofoil blade has a fourth cambered cross-section. The fourth cambered cross-section being cambered in the same sense as the first cambered cross-section.

In one arrangement, the boundary layer propulsor comprises two first aerofoil blades and eight second aerofoil blades. The use of more second aerofoil blades increases the efficiency of the propulsor at accelerating the boundary layer flow and so reduces the associated wake losses.

Optionally, a radial length of each second aerofoil blade is equal to a radial length of each radially proximal portion of the first aerofoil blades.

Each second aerofoil blade is intended only to accelerate the boundary layer flow. Optionally, the plurality of second aerofoil blades is equi-spaced radially between the first aerofoil blades.

Optionally, each of the first aerofoil blades has a first chord length, and the first chord length decreases from the radially innermost end of the first aerofoil blade to the radially outermost end of the first aerofoil blade.

The mechanical loading experienced by the first aerofoil blades will be greater at the rotor end (i.e. at a proximal end) than at the tip (i.e. at a distal end). Consequently, the weight efficiency of the first aerofoil blades may be improved by making the chord of the first aerofoil blade wider at the proximal end than at the distal end.

According to a third aspect of the present disclosure there is provided a boundary layer propulsion system including a machine body having an upstream end and an opposite downstream end, and a boundary layer propulsor according to the first aspect. The boundary layer propulsor is positioned at the downstream end of the machine body such that a fluid flow passing over the machine body, from the upstream end to the downstream end, flows over the plurality of first aerofoil blades. The fluid flow passing over the radially distal portions of the first aerofoil blades causes a rotation of the boundary layer propulsor relative to the machine body, and thereby causes the radially proximal portions to entrain a boundary layer flow passing over the surface of the machine body to thereby accelerate the boundary layer flow.

The boundary layer propulsion system uses energy drawn from the free stream passing over the machine body to impart rotation to the boundary layer propulsor via the free stream interaction with the radially distal portions of the first aerofoil blades.

The rotation of the boundary layer propulsor then accelerates the boundary layer flow over the machine body by the rotation of the radially proximal portions of the first aerofoil blades.

The acceleration of the boundary layer flow results in a reduction in the mixing losses as the boundary layer flow leaves the machine body. The energy saved as a result of this reduction in the mixing losses is greater than the energy drawn from the free stream to power the propulsor. Thus the boundary layer propulsion system can increase the efficiency of the powered machine body making it attractive for a user.

Optionally, the boundary layer propulsor according to the first aspect, comprises the boundary layer propulsor according to the second aspect, and wherein the rotation of the boundary layer propulsor relative to the machine body causes the second aerofoil blades to entrain a boundary layer flow passing over the surface of the machine body to thereby accelerate the boundary layer flow.

The addition of supplementary second aerofoil blades increases the degree of acceleration that can be imparted to the boundary layer flow by the boundary layer propulsor so increasing the amount by which the mixing losses (as the boundary layer flow leaves the machine body) are reduced.

According to a fourth aspect of the disclosure, there is provided an aircraft comprising a boundary layer propulsion system according to the third aspect.

In one arrangement, the boundary layer propulsor is positioned at the rearmost portion of the fuselage of the aircraft. This positioning provides the aircraft with additional stability which in turn enables the vertical and/or horizontal stabiliser surfaces of the aircraft to be reduced in area. This reduces the aerodynamic losses associated with these stabilising surfaces so increasing the aerodynamic efficiency of the aircraft.

This rearmost positioning of the boundary layer propulsor means that the plane of the first aerofoil blades and the plane of the second aerofoil blades is behind the vertical and horizontal tail surfaces of the aircraft. Thus in the event of a disc burst event, any debris emanating from a failure of the first and/or second aerofoil blades will not impinge on the aircraft's fuselage structure.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which:

FIG. 1A shows an illustration of the skin friction and wake mixing losses for an aircraft having a pod mounted engine;

FIG. 1B shows how the wake and jet mixing losses can be eliminated by boundary layer ingestion;

FIG. 2 shows a schematic perspective partial view of a boundary layer propulsor according to a first embodiment of the disclosure;

FIG. 4 shows a schematic end view of a boundary layer propulsor according to a second embodiment of the disclosure;

FIG. 5 shows a schematic end view of a boundary layer propulsor according to a third embodiment of the disclosure.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 3:
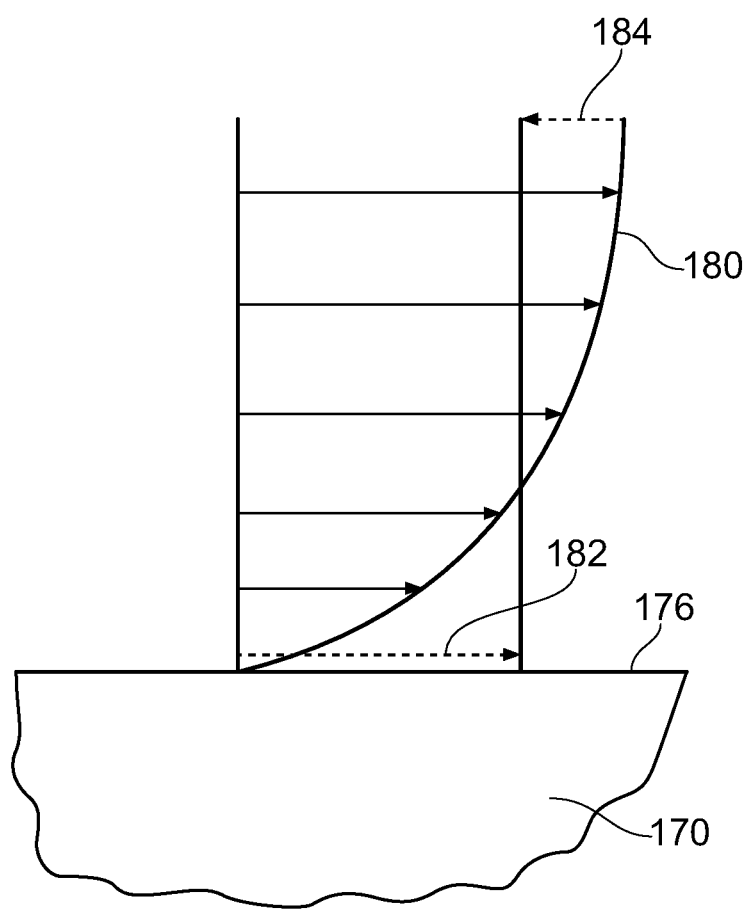
FIG. 3 shows a velocity profile at an aircraft surface illustrating the transfer of work achieved by the boundary layer propulsor of the disclosure.

Referring to FIGS. 2 and 3, a passive boundary layer propulsor according to a first embodiment of the disclosure is designated generally by the reference numeral 100. The following disclosure describes the application of the boundary layer propulsor to an aircraft. However, it is to be understood that the boundary layer propulsor of the disclosure may equally be applied to a machine body passing through an alternative fluid flow stream, such as a submersible vessel. The machine body 170 has an upstream end 172 and an opposite downstream end 174.

The boundary layer propulsor 100 has a rotor 110 having an axis of rotation 112, and a plurality of first aerofoil blades 120. Each of the first aerofoil blades 120 extends radially from the rotor 110. The plurality of first aerofoil blades 120 is arranged in a circumferential array around the axis of rotation 112.

Each first aerofoil blade 120 has, in a radially outward sequence, a radially proximal portion 130, a middle portion 140, and a radially distal portion 150.

The radially proximal portion 130 has a first cambered cross-section 132, the middle portion 140 has a second uncambered cross-section 142, and the radially distal portion 150 has a third cambered cross-section 152. The first cambered cross-section 132 is cambered in an opposite sense to the third cambered cross-section 152.

The first cambered cross-section 132 is a positive camber, and the third cambered cross-section 152 is a negative camber. In this way the radially distal portion 150 of the first aerofoil blades 120 are configured as a turbine array, and the radially proximal portion 130 of the first aerofoil blades 120 are configured as a compressor array.

Each first aerofoil blade 120 has a pressure surface 122 and an opposite suction surface 124 with each of the pressure surface 122 and suction surface 124 being provided with a smoothed transition between the radially proximal portion 130 and the middle portion 140, and between the middle portion 140 and the radially distal portion 150.

Each of the first aerofoil blades 120 has a first chord length 126. In the embodiment shown in FIG. 2, the first chord length 126 decreases from the radially innermost end 127 of the first aerofoil blade 120 to the radially outermost end 128 of the first aerofoil blade 120.

In this arrangement, the boundary layer propulsor 100 has two first aerofoil blades 120 that are spaced opposite one another around the axis of rotation 112.

In use, the boundary layer propulsor 100 is mounted to the tail 170 of an aircraft (not shown) and an air flow 114 passes over the surface of the aircraft. FIG. 3 provides a schematic illustration of the velocity profile of the air flow over a surface 176 of the aircraft tail 170.

The velocity profile 180 increases from zero at the surface 176 to a free stream velocity 114. In the boundary layer propulsor 100 of the disclosure, an amount of energy (represented by reference numeral 184) is extracted from the free stream flow 114 to generate rotation of the propulsor and this is transferred to energy (represented by reference numeral 182) used to accelerate the boundary layer flow 116.

As the air flow passes over the first aerofoil blades 120, the radially distal portions 150, acting as a turbine array, extract energy from the free stream flow 114 and generate rotation of the boundary layer propulsor 100. This rotation causes the radially proximal portions 130, acting as a compressor array to accelerate the boundary layer flow 116 passing over the surface 176 of the machine body 170.

This acceleration of the boundary layer flow 116 reduces the mixing losses experienced by the boundary layer flow 116 when it leaves the surface 176 of the aircraft at a downstream end 174.

Referring to FIG. 4, a boundary layer propulsor according to a second embodiment of the disclosure is designated generally by the reference numeral 200. Features of the boundary layer propulsor 200 which correspond to those of boundary layer propulsor 100 have been given corresponding reference numerals for ease of reference.

The boundary layer propulsor 200 has two first aerofoil blades 120, as described above in relation to the first embodiment, and eight second aerofoil blades 160. Each of the second aerofoil blades 160 extends radially from the rotor 110. The second aerofoil blades 160 are arranged in a circumferential array around the axis of rotation 112.

In this arrangement, four of the second aerofoil blades 160 are arranged on each side of the rotor 110 and equi-spaced from the two first aerofoil blades 120.

Each second aerofoil blade 160 has a fourth cambered cross-section, with the fourth cambered cross-section being cambered in the same sense as the first cambered cross-section 132.

Each of the second aerofoil blades 160 has a radial length 164 that is equal to a radial length 134 of each radially proximal portion 130 of the first aerofoil blades 120. In other words, the radially proximal portions 130 of each of the first aerofoil blades 120 together with the second aerofoil blades 160 together define a compressor array.

In use the boundary layer propulsor 200 operates in the same manner as the boundary layer propulsor 100 that has been described above, with the second aerofoil blades 160 acting to supplement the radially proximal portions 130 of each of the first aerofoil blades 120 in accelerating the boundary layer flow of the surface 176 of the aircraft 170.

Referring to FIG. 5, a boundary layer propulsor according to a third embodiment of the disclosure is designated generally by the reference numeral 300. Features of the boundary layer propulsor 300 which correspond to those of boundary layer propulsor 100 have been given corresponding reference numerals for ease of reference.

The boundary layer propulsor 300 has four first aerofoil blades 120, and eight second aerofoil blades 160. Each of the second aerofoil blades 160 extends radially from the rotor 110. The second aerofoil blades 160 are arranged in a circumferential array around the axis of rotation 112.

In this arrangement, two of the second aerofoil blades 160 are positioned in an equi-spaced arrangement between each pair of adjacent first aerofoil blades 120.

Each second aerofoil blade 160 is as described above in relation to the second embodiment.

In use the boundary layer propulsor 300 operates in the same manner as the boundary layer propulsor 100 that has been described above, with the second aerofoil blades 160 acting to supplement the radially proximal portions 130 of each of the first aerofoil blades 120 in accelerating the boundary layer flow 116 of the surface 176 of the aircraft 170.

Figure 6:
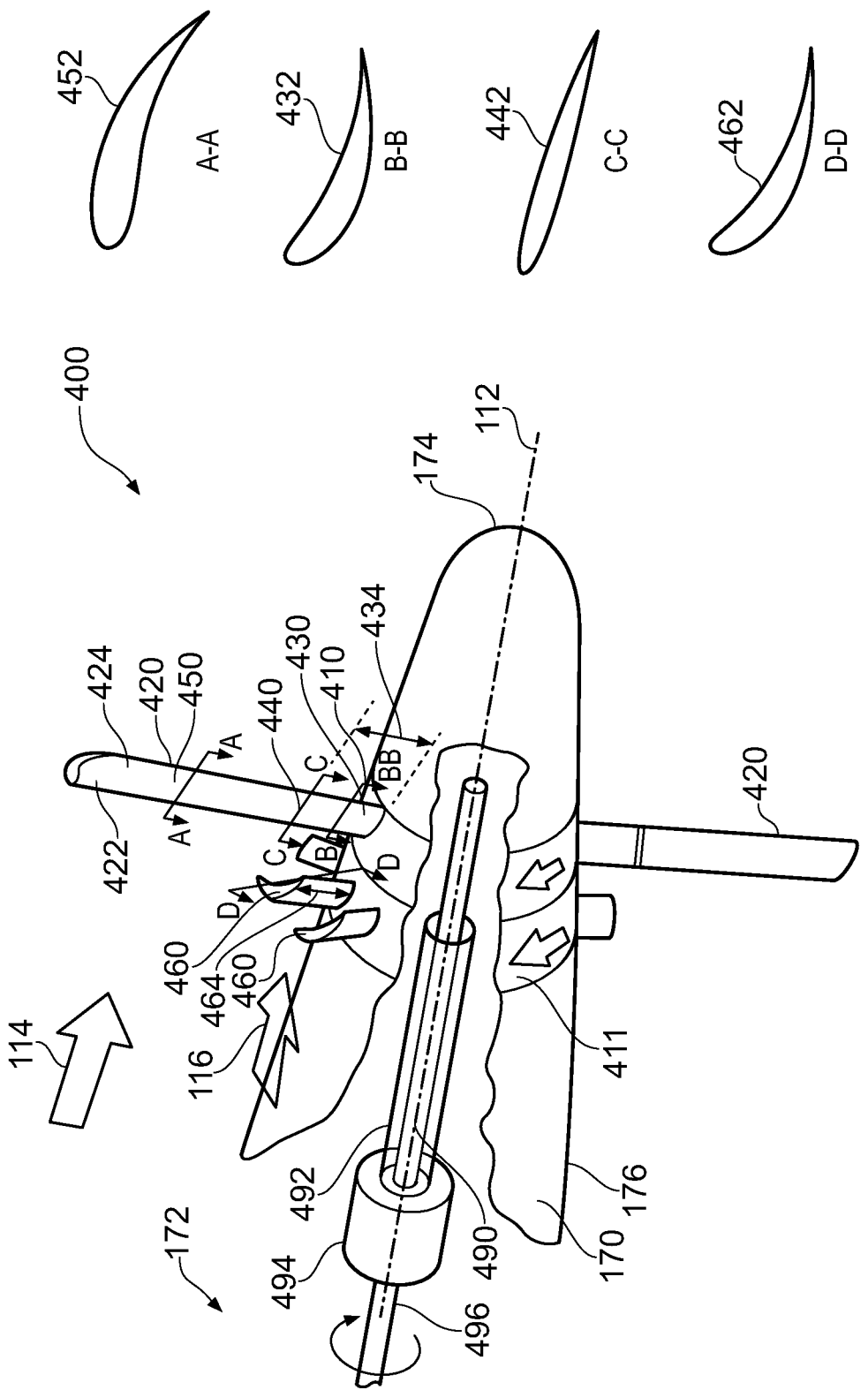
FIG. 6 shows a schematic perspective partial view of a boundary layer propulsor according to a fourth embodiment of the disclosure.

Referring to FIG. 6, a boundary layer propulsor according to a fourth embodiment of the disclosure is designated generally by the reference numeral 400. Features of the boundary layer propulsor 400 which correspond to those of boundary layer propulsor 100 have been given corresponding reference numerals for ease of reference.

The boundary layer propulsor 400 has a first rotor 410 and a second rotor 411. Each of the first rotor 410 and the second rotor 411 are co-located in axial sequence on the axis of rotation 112. The second rotor 411 is positioned upstream of the first rotor 410.

The first rotor 410 has two first aerofoil blades 420. Each of the first aerofoil blades 420 extends radially from the first rotor 410. The first aerofoil blades 420 are equi-spaced around the axis of rotation 112. Each first aerofoil blade 420 is as described above in relation to the first embodiment.

The second rotor 411 has sixteen second aerofoil blades 460. Each of the second aerofoil blades 460 extends radially from the second rotor 411. The second aerofoil blades 460 are equi-spaced around the axis of rotation 112. Each second aerofoil blade 460 is as described above in relation to the first embodiment.

Each first aerofoil blade 420 has, in a radially outward sequence, a radially proximal portion 430, a middle portion 440, and a radially distal portion 450.

The radially proximal portion 430 has a first cambered cross-section 432, the middle portion 440 has a second uncambered cross-section 442, and the radially distal portion 450 has a third cambered cross-section 452. The first cambered cross-section 432 is cambered in an opposite sense to the third cambered cross-section 452.

The third cambered cross-section 452 is a positive camber, and the first cambered cross section 432 is a negative camber. In this way the radially distal portion 450 of the first aerofoil blades 420 are configured as a turbine array, and the radially proximal portion 430 of the first aerofoil blades 420 are configured as a compressor array.

Each first aerofoil blade 420 has a pressure surface 422 and an opposite suction surface 424 with each of the pressure surface 422 and suction surface 424 being provided with a smoothed transition between the radially proximal portion 430 and the middle portion 440, and between the middle portion 440 and the radially distal portion 450.

Each second aerofoil blade 460 has a fourth cambered cross-section 462, with the fourth cambered cross-section 462 being cambered in the same sense as the first cambered cross-section 432.

Each of the second aerofoil blades 460 has a radial length 464 that is equal to a radial length 434 of each radially proximal portion 430 of the first aerofoil blades 420. In other words, the radially proximal portions 430 of each of the first aerofoil blades 420 together with the second aerofoil blades 460 together define a compressor array.

Rotational drive to the boundary layer propulsor 400 is provided via a shaft 496 from a source of motive power (not shown). The source of motive power may be an electric motor, a gas turbine engine, a shaft drive from another engine, or another source.

The shaft 496 provides an input drive to a gearbox 494. A first output drive 490 from the gearbox 494 drives the first rotor 410, and a second output drive 492 from the gearbox 494 droves the second rotor 411. The second output drive 492 provides a 4:1 step-up over the first output drive 490.

In use the boundary layer propulsor 400 operates in the same manner as the boundary layer propulsor 200 that has been described above, with the second aerofoil blades 460 acting to supplement the radially proximal portions 430 of each of the first aerofoil blades 420 in accelerating the boundary layer flow 116 of the surface 176 of the aircraft 170.

The step-up in speed ratio between the first rotor 410 and the second rotor 411 enables the second rotor and the corresponding second aerofoil blades 460 to generate a higher pressure ratio in the acceleration of the boundary layer flow 116.

The relatively lower rotational speed of the first aerofoil blades 420 enables them to act effectively as Outlet Guide Vanes in their hub portion and as a turbine array in their tip portion.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The breadth of the present invention is not to be limited to the examples provided and/or the subject specification, but rather only by the scope of claim language associated with this disclosure.

The invention claimed is:

1. A boundary layer propulsor comprising:
a rotor having an axis of rotation;
a plurality of first aerofoil blades extending radially from the rotor and arranged in a circumferential array around the axis of rotation, each first aerofoil blade has, in a radially outward sequence, a radially proximal portion, a middle portion, and a radially distal portion,
wherein the radially proximal portion has a first cambered cross-section, the middle portion has a second uncambered cross-section, and the radially distal portion has a third cambered cross-section, the first cambered cross-section being cambered in an opposite sense to the third cambered cross-section, wherein the boundary layer propulsor is not actively powered by an engine or other equivalent source of motive power; and
a plurality of second aerofoil blades extending radially from the rotor and arranged in a circumferential array around the axis of rotation,
wherein each second aerofoil blade has a fourth cambered cross-section, the fourth cambered cross-section being cambered in the same sense as the first cambered cross-section,
and wherein a radial length of each second aerofoil blade is equal to a radial length of each radially proximal portion of the first aerofoil blades.

2. The boundary layer propulsor as claimed in claim 1, wherein the first cambered cross-section is a negative camber, and the third cambered cross-section is a positive camber.

3. The boundary layer propulsor as claimed in claim 1, wherein each first aerofoil blade has a first surface and an opposite second surface, each of the first surface and second surface being provided with a smoothed transition between the radially proximal portion and the middle portion, and between the middle portion and the radially distal portion.

4. The boundary layer propulsor as claimed in claim 1, wherein the plurality of first aerofoil blades comprises between two and six first aerofoil blades.

5. The boundary layer propulsor as claimed in claim 1, wherein the plurality of first aerofoil blades is equi-spaced around the axis of rotation.

6. The boundary layer propulsor as claimed in claim 1, wherein the plurality of second aerofoil blades is equi-spaced radially between the first aerofoil blades.

7. The boundary layer propulsor as claimed in claim 1, wherein each of the first aerofoil blades has a first chord length, and the first chord length decreases from the radially innermost end of the first aerofoil blade to the radially outermost end of the first aerofoil blade.

8. A boundary layer propulsion system comprising:
a machine body having an upstream end and an opposite downstream end; and
a boundary layer propulsor comprising:
a rotor having an axis of rotation; and
a plurality of first aerofoil blades extending radially from the rotor and arranged in a circumferential array around the axis of rotation, each first aerofoil blade has, in a radially outward sequence, a radially proximal portion, a middle portion, and a radially distal portion, wherein the radially proximal portion has a first cambered cross-section, the middle portion having a second uncambered cross-section, and the radially distal portion has a third cambered cross-section, the first cambered cross-section being cambered in an opposite sense to the third cambered cross-section, wherein the boundary layer propulsor is positioned at the downstream end of the machine body such that a fluid flow passing over the machine body, from the upstream end to the downstream end, flows over the plurality of first aerofoil blades, the fluid flow passing over the radially distal portions of the first aerofoil blades causes a rotation of the boundary layer propulsor relative to the machine body, and thereby causes the radially proximal portions to entrain a boundary layer flow passing over a surface of the machine body to thereby accelerate the boundary layer flow, and wherein the boundary layer propulsor is not actively powered by an engine or other equivalent source of motive power; and a plurality of second aerofoil blades extending radially from the rotor and arranged in a circumferential array around the axis of rotation, wherein each second aerofoil blade has a fourth cambered cross-section, the fourth cambered cross-section being cambered in the same sense as the first cambered cross-section, and wherein a radial length of each second aerofoil blade is equal to a radial length of each radially proximal portion of the first aerofoil blades.

9. The boundary layer propulsion system as claimed in claim 8, wherein the rotation of the boundary layer propulsor relative to the machine body causes the second aerofoil blades to entrain a boundary layer flow passing over the surface of the machine body to thereby accelerate the boundary layer flow.

10. The boundary layer propulsion system of claim 8 included in an aircraft.

* * * * *